R. P. STANDEFORD.
HOOK.
APPLICATION FILED AUG. 7, 1908.
918,791.
Patented Apr. 20, 1909.
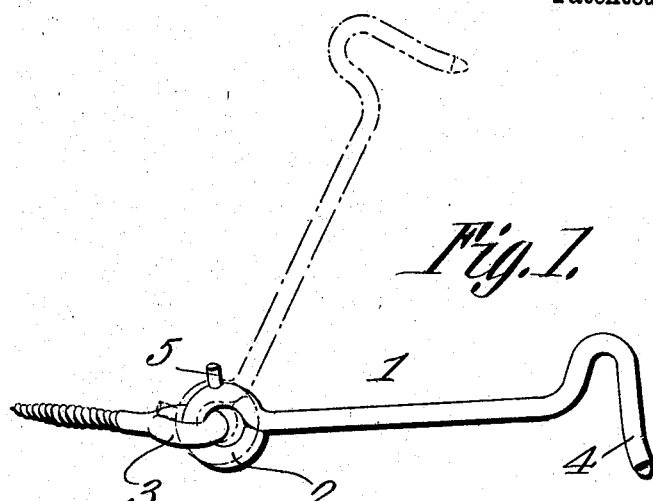
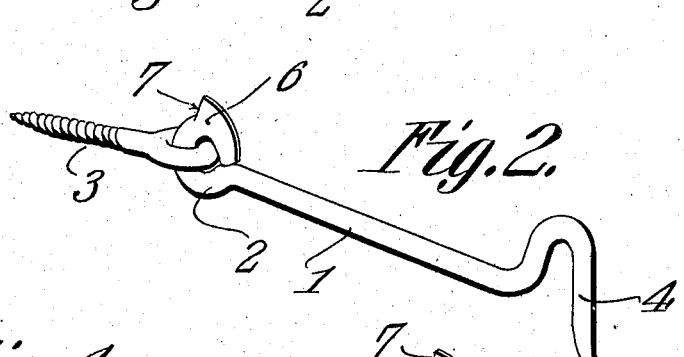
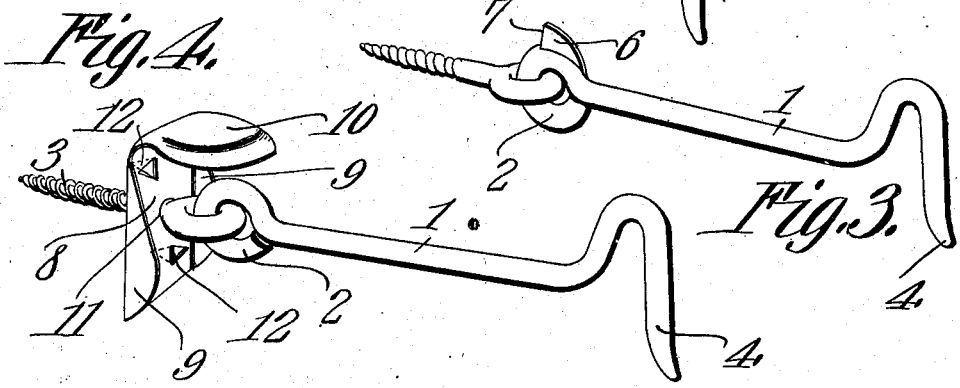
Witnesses
Inventor
Robert P. Standeford.
By C. A. Snow & Co.
Attorneys

UNITED STATES PATENT OFFICE.

ROBERT P. STANDEFORD, OF COLORADO CITY, COLORADO.

HOOK.

No. 918,791.   Specification of Letters Patent.   Patented April 20, 1909.

Application filed August 7, 1908. Serial No. 447,467.

*To all whom it may concern:*

Be it known that I, ROBERT P. STANDEFORD, a citizen of the United States, residing at Colorado City, in the county of El Paso and State of Colorado, have invented a new and useful Hook, of which the following is a specification.

This invention relates to hooks; and has for its object to provide a stop device for loosely swinging hooks which shall prevent them from being thrown upwardly with such force as to remain elevated and locked with the point of the hook projecting outwardly in position to injure, or tear the clothing of, a person passing near the misplaced hook.

The invention is also advantageous when applied on door hooks especially to the type usually found on screen doors. In the latter case the hook often falls on and becomes locked to the attaching screw eye across the stile of the door, projecting therefrom to such an extent that when the door closes, the hook strikes the door frame and prevents complete closure of the door, permitting flies to enter the house.

With this object in view the invention consists of the novel construction and combination of parts hereinafter described and claimed, and illustrated in the accompanying drawing, in which:—

Figures 1, 2 and 3 are perspective views of different forms of the invention applied to the supporting eye of the hook; and Fig. 4 a like view of a stop device to be used with an ordinary hook of the same type but independent of the hook.

Similar reference characters are used for the same parts in all the figures.

In the drawing, 1 indicates a hook of well known type having an eye 2 at one end loosely coupled to a screw eye 3 for securing the hook in operative position, say on a screen door. The opposite end of the hook 1 has the usual pointed finger 4 to enter a screw eye or staple (not shown) on a door frame or other fixed or movable part.

Projecting radially from the outside of the eye 2 of the hook is a short pin 5 standing at an angle of about ninety degrees to the body of the hook, see Fig. 1, so that when the hook is disconnected by raising it, the pin 5 will strike the screw eye 3 and prevent the hook 1 from reaching a vertical position, see dotted lines, in which latter position the hook is liable to fall rearwardly or to the side and project beyond the edge of a screen door, should it be attached to one, and prevent it closing, thus permitting the entrance of flies or any other insects into the house. By means of the pin 5, the hook cannot become locked above the screw eye 3 when suddenly lifted to open the door, a fault common with the usual hook, but will always drop into a pendent position, ready for the hand.

Figs. 2 and 3 show similar modifications of the eye of the hook, each form having a lug 6 integral with the eye 2 of the hook and provided with a shoulder 7 to strike the screw eye 3 when the hook is raised in a manner similar to Fig. 1.

In Fig. 4 is represented a stop to be used with the ordinary hook. It consists of a plate 8 having side wings 9 disposed at right angles and said wings being beveled outwardly from the top to the bottom of the plate, and an overhanging shield 10 at the top, against which wings and shield the hook strikes when raised and is forced thereby to a pendent position. A hole 11 is made in the center of the plate 8 for the screw eye 3 which holds said plate in position assisted by one or more angular fingers 12 stamped from the plate which are driven into the material holding the screw eye.

From the above description the construction and operation of the invention will be readily understood without further description.

What is claimed is:

1. A hook, a horizontally disposed eye to which said hook is loosely pivoted, and means for preventing the hook being raised to vertical position.

2. A hook having an eye at one end by which it is loosely suspended, said eye having a projection on its outer surface, and means for suspending said hook and forming an abutment for said projection.

In testimony that I claim the foregoing as my own, I have hereto affixed my signature in the presence of two witnesses.

ROBERT P. STANDEFORD.

Witnesses:
WILLIAM E. ROLES,
ROBERT J. REESE.